US009047765B2

(12) United States Patent
Sutardja

(10) Patent No.: US 9,047,765 B2
(45) **Date of Patent: *Jun. 2, 2015**

(54) GPS-BASED TRAFFIC MONITORING SYSTEM

(75) Inventor: Sehat Sutardja, Los Altos Hills, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 2070 days.

This patent is subject to a terminal disclaimer.

(21) Appl. No.: 11/171,563

(22) Filed: Jun. 30, 2005

(65) Prior Publication Data

US 2007/0005224 A1 Jan. 4, 2007

(51) Int. Cl.

| | |
|---|---|
| ***G06F 19/00*** | (2011.01) |
| ***G08G 1/01*** | (2006.01) |
| ***G08G 1/0967*** | (2006.01) |
| ***G08G 1/14*** | (2006.01) |
| ***G08G 1/00*** | (2006.01) |

(52) U.S. Cl.

CPC ........ *G08G 1/0104* (2013.01); *G08G 1/096716* (2013.01); *G08G 1/096741* (2013.01); *G08G 1/096758* (2013.01); *G08G 1/096775* (2013.01); *G08G 1/096791* (2013.01); *G08G 1/14* (2013.01); *G08G 1/20* (2013.01)

(58) Field of Classification Search

CPC .......... G08G 1/0104; G08G 1/096716; G08G 1/096741; G08G 1/20; G08G 1/096775; G08G 1/096791; G08G 1/14; G08G 1/096758

USPC .......................................................... 701/117

See application file for complete search history.

(56) References Cited

U.S. PATENT DOCUMENTS

| | | | | |
|---|---|---|---|---|
| 3,715,572 | A | 2/1973 | Bennett | |
| 5,539,645 | A | 7/1996 | Mandhyan et al. | |
| 5,812,069 | A | 9/1998 | Albrecht et al. | |
| 5,910,782 | A * | 6/1999 | Schmitt et al. | 340/995.12 |
| 5,933,100 | A | 8/1999 | Golding | |
| 6,092,020 | A | 7/2000 | Fastenrath et al. | |
| 6,150,961 | A | 11/2000 | Alewine et al. | |
| 6,236,932 | B1 | 5/2001 | Fastenrath | |
| 6,266,609 | B1 | 7/2001 | Fastenrath | |
| 6,333,703 | B1 | 12/2001 | Alewine et al. | |
| 6,407,689 | B1 | 6/2002 | Bazarjani et al. | |

(Continued)

FOREIGN PATENT DOCUMENTS

| | | |
|---|---|---|
| EP | 0 755 039 A | 1/1997 |
| EP | 1081668 A2 | 3/2001 |

(Continued)

OTHER PUBLICATIONS

Wolfgang Schneider; "Talking Cars"; BMW Magazine, The New Roadster Generation; Jan. 2006; 6 pages.

(Continued)

*Primary Examiner* — Marthe Marc-Coleman

(57) ABSTRACT

A traffic information system for a vehicle comprises a transmitter and a global positioning system (GPS) associated with the vehicle that selectively generates location and vector data. A control module receives the location and vector data and wirelessly transmits the location and vector data using the transmitter when the vehicle is traveling on a first set of predetermined roads and does not transmit the location and vector data when the vehicle is traveling on a second set of predetermined roads.

40 Claims, 11 Drawing Sheets

(56) References Cited

U.S. PATENT DOCUMENTS

| | | | | |
|---|---|---|---|---|
| 6,407,698 | B1 * | 6/2002 | Ayed | 342/357.07 |
| 6,418,374 | B2 | 7/2002 | Sakamoto et al. | |
| 6,426,709 | B1 | 7/2002 | Becker et al. | |
| 6,466,862 | B1 * | 10/2002 | DeKock et al. | 701/117 |
| 6,473,688 | B2 | 10/2002 | Kohno et al. | |
| 6,480,183 | B1 | 11/2002 | Van Ruymbeke et al. | |
| 6,480,783 | B1 * | 11/2002 | Myr | 701/117 |
| 6,501,391 | B1 * | 12/2002 | Racunas, Jr. | 340/932.2 |
| 6,564,259 | B1 | 5/2003 | Baber et al. | |
| 6,611,688 | B1 | 8/2003 | Raith | |
| 6,707,421 | B1 * | 3/2004 | Drury et al. | 342/357.1 |
| 6,711,493 | B1 | 3/2004 | Andrews et al. | |
| 6,741,927 | B2 | 5/2004 | Jones | |
| 6,791,472 | B1 | 9/2004 | Hoffberg | |
| 6,798,356 | B2 * | 9/2004 | Flick | 340/989 |
| 6,801,837 | B2 | 10/2004 | Carlstedt et al. | |
| 6,804,524 | B1 | 10/2004 | Vandermeijden | |
| 6,804,602 | B2 | 10/2004 | Impson et al. | |
| 6,965,325 | B2 | 11/2005 | Finnern | |
| 6,973,384 | B2 | 12/2005 | Zhao et al. | |
| 7,002,486 | B2 | 2/2006 | Lawrence | |
| 7,260,472 | B2 | 8/2007 | Sutardja | |
| 7,268,700 | B1 | 9/2007 | Hoffberg | |
| 7,392,130 | B1 * | 6/2008 | Rosen et al. | 701/117 |
| 7,505,784 | B2 | 3/2009 | Barbera | |
| 7,885,758 | B2 | 2/2011 | Sutardja | |
| 7,885,759 | B2 | 2/2011 | Sutardja | |
| 7,885,760 | B2 | 2/2011 | Sutardja | |
| 7,983,839 | B2 | 7/2011 | Sutardja | |
| 8,064,931 | B2 | 11/2011 | Sutardja | |
| 2002/0019703 | A1 | 2/2002 | Levine | |
| 2002/0154035 | A1 | 10/2002 | Flick | |
| 2002/0171562 | A1 | 11/2002 | Muraki | |
| 2003/0009275 | A1 | 1/2003 | Koike | |
| 2003/0014180 | A1 | 1/2003 | Myr | |
| 2003/0061018 | A1 | 3/2003 | Snyder | |
| 2003/0112154 | A1 | 6/2003 | Yoakum et al. | |
| 2003/0162536 | A1 | 8/2003 | Panico | |
| 2003/0225600 | A1 | 12/2003 | Slivka et al. | |
| 2004/0104842 | A1 | 6/2004 | Drury et al. | |
| 2004/0119612 | A1 * | 6/2004 | Chen | 340/995.13 |
| 2004/0233070 | A1 | 11/2004 | Finnern | |
| 2004/0246147 | A1 | 12/2004 | Von Grabe | |
| 2005/0065711 | A1 | 3/2005 | Dahlgren et al. | |
| 2005/0131643 | A1 | 6/2005 | Shaffer et al. | |
| 2005/0143096 | A1 | 6/2005 | Boesch | |
| 2005/0171663 | A1 * | 8/2005 | Mittelsteadt et al. | 701/35 |
| 2005/0256762 | A1 * | 11/2005 | Dar et al. | 705/13 |
| 2006/0025897 | A1 | 2/2006 | Shostak et al. | |
| 2006/0136291 | A1 | 6/2006 | Morita et al. | |
| 2006/0226968 | A1 | 10/2006 | Tengler et al. | |
| 2006/0250278 | A1 | 11/2006 | Tillotson et al. | |
| 2007/0010241 | A1 | 1/2007 | Wachter et al. | |

FOREIGN PATENT DOCUMENTS

| | | | |
|---|---|---|---|
| EP | DE 101 36 342 | A1 | 3/2002 |
| EP | DE 100 54 573 | A1 | 5/2002 |
| EP | DE 102 30 104 | A1 | 1/2004 |
| EP | GB 2 405 204 | A | 2/2005 |
| JP | 2004 150827 | A | 1/2004 |
| TW | 279960 | B | 7/1996 |
| TW | 462033 | B | 11/2001 |
| TW | 559741 | B | 11/2003 |
| TW | I240898 | B | 10/2005 |
| TW | I243770 | B | 11/2005 |
| TW | M287983 | U | 2/2006 |
| TW | I263175 | B | 10/2006 |
| WO | WO 02/071364 | | 9/2002 |
| WO | WO 02/089089 | | 11/2002 |
| WO | WO 2005/098780 | A | 10/2005 |
| WO | WO-2005/098780 | A1 | 10/2005 |
| WO | WO 2006/085410 | A | 8/2006 |

OTHER PUBLICATIONS

Notification of Transmittal of the International Search Report and the Written Opinion of the International Searching Authority, or the Declaration dated Apr. 25, 2008 in reference to PCT/US2007/018643 (13 pgs).

Notification of Transmittal of the International Search Report and the Written Opinion of the International Searching Authority, or the Declaration dated Apr. 25, 2008 in reference to PCT/US2007/020524 (15 pgs).

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11b-1999/Cor 1-2001 (Corrigendum to IEEE Std 802.11-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 2: Higher-Speed Physical Layer (PHY) extension in the 2.4 GHz Band—Corrigendum 1; LAN/MAN Standards Committee of the IEEE Computer Society; Nov. 7, 2001; 23 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; May 2005; 131 pages.

IEEE Standard 802.16-2004; IEEE Standard for Local and metropolitan area networks, Part 16: Air Interface for Fixed Broadband Wireless Access Systems, IEEE Computer Society and the IEEE Microwave Theory and Techniques Society; Oct. 1, 2004, 857 pages.

Search Report and Written Opinion from the Australian Patent Office dated Sep. 3, 2007 for Application No. SG 200603453-2; 9 pages.

Notification of European Search Report dated Apr. 7, 2009 in reference to European Patent Application 06011022.8-2215/ 1742191 (18 pgs).

First Office Action received on Feb. 11, 2014 for Taiwanese Patent Application No. 096130868, 6 pages.

First Office Action mailed Jan. 27, 2014 for Taiwanese Patent Application No. 096130864, 8 pages.

* cited by examiner

GPS-BASED TRAFFIC MONITORING SYSTEM

FIELD OF THE INVENTION

The present invention relates to traffic monitoring systems, and more particularly to global positioning system (GPS)-based traffic monitoring systems for vehicles.

BACKGROUND OF THE INVENTION

Global positioning systems (GPS) for vehicles typically include a receiver that triangulates vehicle position using beacons generated by GPS satellites. These systems also typically include a map database that is used to provide the location of the vehicle on a map, driving directions, the location of restaurants and other businesses, and/or other information. As cities become more populated, it has become more difficult to travel without incurring delays due to traffic congestion, accidents, construction and/or other problems. Finding parking in congested cities can also be difficult.

SUMMARY OF THE INVENTION

A traffic information system for a vehicle comprises a transmitter and a global positioning system (GPS) associated with the vehicle that selectively generates location and vector data. A control module receives the location and vector data and wirelessly transmits the location and vector data using the transmitter when the vehicle is traveling on a first set of predetermined roads and does not transmit the location and vector data when the vehicle is traveling on a second set of predetermined roads.

In other features, a receiver communicates with the control module and wirelessly receives traffic reports from a remote traffic monitoring system. The traffic reports include traffic speed information for traffic traveling on at least one road of the first set of predetermined roads. A service assistance system communicates with the control module and wirelessly communicates with a remote service assistance system.

In still other features, the remote traffic monitoring system receives the vector and location data and compares a speed of the vehicle on a first road to a first threshold and to an average traffic speed on the first road and selectively triggers contact with the vehicle using the service assistance system and the remote service assistance system. The traffic reports include parking status information for public parking spots. The parking status information for the public parking spots includes at least one status type selected from a group consisting of leaving, filled, open and unknown.

In yet other features of the invention, the control module transmits the vector and location data on a periodic basis. The control module monitors changes in direction of the vehicle and transmits the vector and location data when the vehicle changes direction greater than a direction change threshold. The control module monitors changes in speed of the vehicle and transmits the vector and location data when the vehicle speed change is greater than a speed change threshold.

In still other features of the invention, the control module selectively transmits parking indication and location data using the transmitter when the vehicle ignition is turned off. The control module selectively transmits parking indication and location data using the transmitter when the vehicle ignition is turned off and the vehicle is parked in a public parking spot. The control module selectively transmits vector and location data using the transmitter when the vehicle leaves the public parking spot.

In yet other features of the invention, the control module selectively generates location and parking indication data when an engine of the vehicle is turned off and selectively transmits the location and parking indication data using the transmitter. A parking monitoring system located remotely from the vehicle receives the location and parking indication data from the vehicle and a plurality of other vehicles, generates parking status reports, and selectively transmits the parking status reports to the vehicle.

In still other features of the invention, a parking lot module associated with a parking lot identifies available parking spots in the parking lot and a parking lot transmitter transmits parking lot data related to the available parking spots to the parking monitoring system. A parking spot module associated with a parking spot identifies a filled status of the parking spot and a parking spot transmitter transmits parking spot data based on the filled status to the parking monitoring system.

In yet other features of the invention, the parking status report is based in part on the parking lot data. The parking report is based in part on the parking spot data. The parking status reports include parking spot information related to parking spots within a predetermined distance of at least one vehicle. The parking spot information includes a parking status for parking spaces on at least one road. The parking status includes at least one selected from the group consisting of vacant, filled, unknown, and leaving. The control module is integrated with the GPS.

A method for operating a traffic information system for a vehicle comprises selectively generating location and vector data using a global positioning system associated with a vehicle, wirelessly transmitting the location and vector data when the vehicle is traveling on a first set of predetermined roads and not transmitting the location and vector data when the vehicle is traveling on a second set of roads.

In still other features of the invention, the method includes wirelessly receiving traffic reports at the vehicle from a remote traffic monitoring system. The traffic reports include traffic speed information for traffic traveling on at least one of the first set of predetermined roads. The method includes comparing a speed of the vehicle on a first road to a first threshold and to an average traffic speed on the first road and selectively triggering contact with the vehicle using a remote service assistance system based on the comparison.

In yet other features of the invention, the traffic reports include parking status information for public parking spots. The parking status information for a parking spot includes at least one status type selected from a group consisting of leaving, filled, open and unknown.

In still other features of the invention, the method comprises transmitting the vector and location data on a periodic basis. The method comprises monitoring changes in direction of the vehicle and transmitting the vector and location data when the vehicle changes direction greater than a direction change threshold.

In yet other features of the invention, the method includes monitoring changes in speed of the vehicle and transmitting the vector and location data when the vehicle speed change is greater than a speed change threshold. The method comprises selectively transmitting parking indication and location data when the vehicle ignition is turned off. The method further comprises selectively transmitting parking indication and location data when the vehicle ignition is turned off and the vehicle is parked in a public parking spot.

In still other features of the invention, the method comprises transmitting vector and location data when the vehicle leaves the public parking spot. The method comprises selectively generating location and parking indication data when an engine of the vehicle is turned off and selectively transmitting the location and parking indication data.

In yet other features of the invention, the method comprises receiving the location and parking indication data from the vehicle and a plurality of other vehicles, generating parking status reports and selectively transmitting the parking status reports to the vehicle. The method further comprises identifying available parking spots in a parking lot, and wirelessly transmitting parking lot data related to the available parking spots to a remote parking monitoring system.

In still other features of the invention, the method includes identifying a filled status of a parking spot and transmitting parking spot data based on the filled status to a remote parking monitoring system. The method includes the parking status report based in part on the parking lot data. The method comprises the parking reports based in part on the parking spot data. The method includes parking spot information related to parking spots within a predetermined distance of at least one vehicle. The method includes the parking spot information includes a parking status for a parking spot. The parking status includes at least one selected from the group consisting of vacant, filled, unknown, and leaving.

A traffic information system for a vehicle comprises global positioning system (GPS) means associated with the vehicle for selectively generating location and vector data, transmitting means for wirelessly transmitting data, and control means for receiving the location and vector data and for wirelessly transmitting the location and vector data using the transmitting means when the vehicle is traveling on a first set of predetermined roads and for not transmitting the location and vector data when the vehicle is traveling on a second set of roads.

In still other features of the invention, the traffic information system comprises receiving means for wirelessly receiving traffic reports from a remote traffic monitoring means for monitoring traffic. The traffic reports include traffic speed information for traffic traveling on at least one of the first set of predetermined roads. Remote service assistance means communicates with the control means and wirelessly communicates with a remote service assistance system. The remote traffic monitoring means compares a speed of the vehicle on a first road to a first threshold and to an average traffic speed on the first road and selectively triggers contact with the vehicle using the remote service assistance system.

In yet other features of the invention, the traffic reports include parking status information for public parking spots. The parking status information for a parking spot includes at least one type selected from a group consisting of leaving, filled, open and unknown.

In still other features of the invention, the control means transmits the vector and location data on a periodic basis. The control means monitors changes in direction of the vehicle and transmits the vector and location data using the transmitting means when the vehicle changes direction greater than a direction change threshold. The control means monitors changes in speed of the vehicle and the transmitting means transmits the vector and location data using the transmitting means when the vehicle speed change is greater than a speed change threshold. The control means selectively transmits parking indication and location data using the transmitting means when the vehicle ignition is turned off.

In yet other features of the invention, the control means selectively transmits parking indication and location data using the transmitting means when the vehicle ignition is turned off and the vehicle is parked in a public parking spot. The control means selectively transmits vector and location data using the transmitting means when the vehicle leaves the public parking spot. The control means selectively generates location and parking indication data when an engine of the vehicle is turned off and selectively transmits the location and parking indication data using the transmitting means.

In still other features of the invention, the traffic information further comprises parking monitoring means for remotely monitoring parking, for receiving the location and parking indication data from the vehicle and a plurality of other vehicles, for generating parking status reports, and for selectively transmitting the parking status reports to the vehicle.

In yet other features of the invention, the system further comprises parking lot means associated with a parking lot for identifying available parking spots in the parking lot and parking lot transmitting means for transmitting parking lot data related to the available parking spots to the parking monitoring means. Parking spot means associated with a parking spot for identifying a filled status of the parking spot and parking spot transmitting means for transmitting parking spot data based on the filled status to the parking monitoring means.

In still other features of the invention, the parking status report is based in part on the parking lot data. The parking report is based in part on the parking spot data. The parking status reports include parking spot information related to parking spots within a predetermined distance of the at least one vehicle. The parking status includes at least one status type selected from the group consisting of vacant, filled, unknown, and leaving.

A system comprises a vehicle that includes a global positioning system (GPS) that selectively generates location and parking indication data when the vehicle is parked. A transceiver selectively wirelessly transmits data. A control module receives the location and parking indication data from the GPS and transmits the location and parking indication data using the transmitter. A parking monitoring system located remotely from the vehicle receives the location and parking indication data from the vehicle and a plurality of other vehicles, generates parking status reports based on the location and parking indication data, and selectively transmits the parking status reports to the vehicle.

In other features, a parking lot module associated with a parking lot identifies an available number of parking spots in the parking lot. A parking lot transmitter transmits parking lot data related to the available number of parking spots to the parking monitoring system. A parking spot module associated with a parking spot identifies a filled status of the parking spot. A parking spot transmitter transmits parking spot data based on the filled status to the parking monitoring system.

In still other features of the invention, the parking status reports are based in part on the parking lot data. The parking reports are based in part on the parking spot data. The parking status report for the vehicle includes parking information related to parking spots within a predetermined distance of the vehicle.

In yet other features, the parking reports include a parking status for parking spaces on predetermined types of roads within a predetermined distance of at least one of the vehicle and another location selected by a user of the GPS. The parking status includes at least one status type selected from the group consisting of vacant, filled, unknown, and leaving. The control module selectively receives location and vector data from the GPS when the vehicle is not parked. The transceiver transmits the location and vector data.

In still other features of the invention, the control module transmits the location and vector data using the transceiver when the vehicle is traveling on a first set of predetermined roads and does not transmit the location and vector data when the vehicle is traveling on a second set of roads. A remote traffic monitoring system receives the vector and location data from the vehicle and other vehicles and generates traffic reports based thereon. The traffic reports include traffic speed information for traffic on at least one road of the first set of predetermined roads.

In yet other features of the invention, a service assistance system communicates with the control module and wirelessly communicates with a remote service assistance system. The remote traffic monitoring system compares a speed of the vehicle on a first road to a first threshold and to an average traffic speed on the first road and selectively triggers contact with the vehicle using the remote service assistance system.

In still other features of the invention, the control module generates the vector and location data on a periodic basis using the transceiver. The control module monitors changes in direction of the vehicle and transmits the vector and location data using the transceiver when the vehicle changes direction greater than a direction change threshold. The control module monitors changes in speed of the vehicle and transmits the vector and location data using the transceiver when the vehicle speed change is greater than a speed change threshold.

In yet other features of the invention, the control module selectively transmits parking indication and location data using the transceiver when the vehicle ignition is turned off. The control module selectively transmits parking indication and location data using the transceiver when the vehicle ignition is turned off and the vehicle is parked in a public parking spot. The control module selectively transmits parking indication and location data using the transceiver when the vehicle leaves a public parking spot.

A method comprises: selectively generating location and parking indication data when a vehicle is parked; selectively wirelessly transmitting the location and parking indication data; receiving the location and parking indication data from the vehicle and a plurality of other vehicles; generating parking status reports based on the location and parking data; and selectively transmitting the parking status reports to the vehicle.

In yet other features, the method includes identifying an available number of parking spots in a parking lot and transmitting parking lot data related to the available number of parking spots to a remote parking monitoring system.

In still other features, the method includes identifying a filled status of a parking spot and transmitting parking spot data based on the filled status to a remote parking monitoring system. The parking status reports are based in part on the parking lot data. The parking reports are based in part on the parking spot data. The parking status reports for the vehicle include parking information related to parking spots within a predetermined distance of the vehicle.

In yet other features of the invention, the parking information includes a parking status for parking spaces on predetermined types of roads within a predetermined distance of at least one of the vehicle and another location selected by a user. The parking status includes at least one status type selected from the group consisting of vacant, filled, unknown, and leaving.

In still other features of the invention, the method includes selectively generating location and vector data when the vehicle is not parked and transmitting the location and vector data. The method further includes transmitting the location and vector data when the vehicle is traveling on a first set of predetermined roads and not transmitting the location and vector data when the vehicle is traveling on a second set of predetermined roads.

In yet other features of the invention, the method includes wirelessly receiving traffic reports from a remote traffic monitoring system. The traffic reports include traffic speed information for traffic on at least one road of the first set of predetermined roads.

In still other features of the invention, the method comprises comparing a speed of the vehicle on a first road to a first threshold and to an average traffic speed on the first road and selectively triggering contact with the vehicle using a remote service assistance system. The method includes transmitting the vector and location data on a periodic basis.

In yet other features of the invention, the method includes monitoring changes in direction of the vehicle and transmitting the vector and location data when the vehicle changes direction greater than a direction change threshold. The method further includes monitoring changes in speed of the vehicle and transmitting the vector and location data when the vehicle speed change is greater than a speed change threshold.

In still other features of the invention, the method includes selectively transmitting parking indication and location data when the vehicle ignition is turned off. The method includes transmitting parking indication and location data when the vehicle ignition is turned off and the vehicle is parked in a public parking spot and selectively transmitting parking indication and location data when the vehicle leaves a public parking spot.

A system comprises a vehicle including that includes global positioning system (GPS) means for selectively generating location and parking indication data when the vehicle is parked, transceiver means for selectively wirelessly transmitting data, and control means for receiving the location and parking indication data from the GPS means and for transmitting the location and parking data using the transceiver means. Parking monitoring means located remotely from the vehicles receives the location and parking indication data from the vehicle and a plurality of other vehicles, generates parking status reports based on the location and parking indication data, and selectively transmits the parking status reports to the vehicle.

In still other features of the invention, parking lot means associated with a parking lot identifies an available number of parking spots in the parking lot. Parking lot transmitting means transmits parking lot data related to the available number of parking spots to the parking monitoring means. Parking spot means associated with a parking spot identifies a filled status of the parking spot. Parking spot transmitting means transmits parking spot data based on the filled status to the parking monitoring means.

In yet other features of the invention, the parking reports are based in part on the parking spot data. The parking status reports for the vehicle include parking information related to parking spots within a predetermined distance of the vehicle.

In still other features of the invention, the parking information includes a parking status for parking spaces on predetermined types of roads within a predetermined distance of at least one of the vehicle and another location selected by a user of the GPS means. The parking status includes at least one selected from the group consisting of vacant, filled, unknown, and leaving.

In yet other features of the invention, the control means selectively generates location and vector data when the vehicle is not parked and the transceiver means transmits the location and vector data. The control means transmits the location and vector data using the transceiver means when the vehicle is traveling on a first set of predetermined roads and does not transmit the location and vector data when the vehicle is traveling on a second set of roads. The system further comprises the remote traffic monitoring means for remotely monitoring traffic. Wherein the transceiver means wirelessly receives traffic reports from the remote traffic monitoring means. The traffic reports include traffic speed information for traffic on at least one of the first set of predetermined roads.

In still other features of the invention, the system comprises remote service assistance means for interfacing with a remote service assistance system. The remote traffic monitoring means compares a speed of the vehicle on a first road to a first threshold and to an average traffic speed on the first road and selectively triggers contact with the vehicle using the remote service assistance system. The control means transmits the vector and location data on a periodic basis.

In yet other features of the invention, the control means monitors changes in direction of the vehicle and transmits the vector and location data using the transceiving means when the vehicle changes direction greater than a direction change threshold. The control means monitors changes in speed of the vehicle and transmits the vector and location data using the transceiving means when the vehicle speed change is greater than a speed change threshold. The control means selectively transmits parking indication and location data using the transceiving means when the vehicle ignition is turned off.

In still other features of the invention, the control means selectively transmits parking indication and location data using the transceiving means when the vehicle ignition is turned off and the vehicle is parked in a public parking spot. The transceiver means selectively transmits parking indication and location data when the vehicle leaves a public parking spot.

A traffic monitoring system comprises memory that stores traffic data. A traffic monitoring module collects vector and location data for a plurality of vehicles when the vehicles are traveling on a first set of predetermined roads and does not collect the vector and location data when the vehicles are traveling on a second set of predetermined roads. The traffic monitoring module stores the vector and location data in the memory, analyzes vector and location data, and generates traffic reports for the first set of predetermined roads based on the analyzed vector and location data.

In other features, the traffic monitoring module receives requests for the traffic reports from at least one vehicle, confirms that the vehicle is a subscriber for the traffic reports, and transmits the traffic reports to the vehicle if the vehicle is a subscriber. The traffic monitoring module receives parking indication and location data for the vehicles and stores the parking indication and location data in the memory. The traffic monitoring module receives the parking indication and location data only for the vehicles that are parked in public parking spots. The traffic monitoring module generates parking reports for the subscribers based on the parking indication and location data.

In still other features of the invention, the traffic monitoring module receives parking lot data for parking lots. The parking lot data indicates a number of vacant parking spots for a respective one of the parking lots. The traffic monitoring module receives parking spot data for parking spots. The parking spot data indicates a filled status of a respective one of the parking spots.

A traffic monitoring system comprises storing means for storing traffic data. Traffic monitoring means collects vector and location data for a plurality of vehicles when the vehicles are traveling on a first set of predetermined roads and does not collect the vector and location data when the vehicles are traveling on a second set of predetermined roads. The traffic monitoring means stores the vector and location data in the storing means, analyzes the vector and location data, and generates traffic reports for the first set of predetermined roads based on the analyzed vector and location data.

In yet other features of the invention, the traffic monitoring means receives requests for the traffic reports from at least one vehicle, confirms that the vehicle is a subscriber for the traffic reports, and transmits the traffic reports to the vehicle if the vehicle is a subscriber. The traffic monitoring means receives parking indication and location data for the vehicles, and stores the parking indication and location data in the storing means. The traffic monitoring means receives the parking indication and location data only for the vehicles that are parked in public parking spots.

In still other features of the invention, the traffic monitoring means generates parking reports for the subscribers based on the parking indication and location data. The traffic monitoring means receives parking lot data for parking lots. The parking lot data indicates a number of vacant parking spots for a respective one of the parking lots. The traffic monitoring means receives parking spot data for parking spots. The parking spot data indicates a filled status of a respective one of the parking spots.

A method for operating a traffic monitoring system comprises storing traffic data, collecting vector and location data for a plurality of vehicles when the vehicles are traveling on a first set of predetermined roads and not collecting the vector and location data when the vehicles are traveling on a second set of predetermined roads, storing the vector and location data, analyzing the vector and location data, and generating traffic reports for the first set of predetermined roads based on the analyzed vector and location data.

In other features, the method comprises receiving requests for the traffic reports from at least one vehicle confirming that the vehicle is a subscriber for the traffic reports, and transmitting the traffic reports to the vehicle if the vehicle is a subscriber. The method includes receiving parking indication and location data for the vehicle and storing the parking indication and location data. The method further comprises receiving the parking indication and location data for the vehicles that are parked in public parking spots.

In yet other features of the invention, the method comprises generating parking reports for the subscribers based on the parking indication and location data. The method comprises receiving parking lot data for parking lots. The parking lot data indicates a number of vacant parking spots for a respective one of the parking lots. The method further comprises receiving parking spot data for parking spots. The parking spot data indicates a filled status of a respective one of the parking spots.

A method for providing traffic information comprises maintaining a list of vehicles that are subscribers of the traffic information, receiving vector and location data from a plurality of vehicles traveling on a first set of roads, analyzing the vector and location data, generating traffic reports based on the vector and location data, and transmitting the traffic reports to the vehicles that are subscribers of the traffic information.

In other features of the invention, the method comprises at least one of receiving requests for the traffic reports from the vehicles and transmitting the traffic reports to subscribers of the traffic reports, and pushing the traffic reports to the subscribers. The method comprises billing the subscribers for the traffic information. The method comprises wirelessly transmitting the location and vector data when one of the plurality of vehicles is traveling on a first set of predetermined roads, and not transmitting the location and vector data when the one of the plurality of vehicles is traveling on a second set of predetermined roads.

In still other features of the invention, the traffic report includes traffic speed information for traffic on at least one road of the first set of predetermined roads. The method further comprises diagnosing a possible problem with a first vehicle using said vector and location data, and using a remote service assistance system to contact said first vehicle when said vector and location data indicates said possible problem.

In yet other features of the invention, the method comprises comparing a speed of one of the vehicles on a first road to a first threshold and to an average traffic speed on the first road, and selectively contacting the vehicle using a remote service assistance system based on the comparison. The method comprises receiving parking data from the vehicles, and generating parking status information for public parking spots based on the parking data. The parking status information includes at least one status type selected from a group consisting of leaving, filled, open and unknown.

In still other features of the invention, the vehicles transmit the vector and location data on a periodic basis. The method comprises monitoring changes in direction of the vehicle, and transmitting the vector and location data when the vehicle changes direction greater than a direction change threshold. The method comprises monitoring changes in speed of the vehicle, and transmitting the vector and location data when the vehicle speed change is greater than a speed change threshold.

In yet other features of the invention, the method further comprises selectively transmitting parking indication and location data when one of the vehicles parks in a public parking spot. The method comprises transmitting vector and location data when the vehicle leaves the public parking spot. The method comprises selectively generating location and parking indication data when an engine of the vehicle is turned off, and selectively transmitting the location and parking indication data.

In yet other features of the invention, the method comprises maintaining a list of vehicles that are subscribers of parking status reports, receiving location and parking indication data from the vehicles, generating the parking status reports, and selectively transmitting the parking status reports to the vehicles that are subscribers. The parking status report for a respective one of the vehicles includes parking information related to parking spots within a predetermined distance of the respective one of the vehicles.

In still other features of the invention, the method comprises monitoring when the vehicle transitions from one road to another road, and transmitting the vector and location data when the transitions occur.

A method for providing parking information comprises maintaining a list of vehicles that are subscribers of the parking information, receiving parking indication and location data from a plurality of vehicles when the vehicles are parked in public parking spots, generating parking reports based on the parking indication and location data, and transmitting the parking reports to the vehicles that are subscribers of the parking information.

In still other features of the invention, the method comprises receiving requests for the parking reports from the vehicles and transmitting the parking reports to subscribers of the parking reports, and pushing the parking reports to the subscribers. The method comprises billing the subscribers for the parking information.

In yet other features, the method comprises wirelessly transmitting the parking indication and location data when one of the plurality of vehicles parks in a public parking spot, and not transmitting the parking indication and location data when the one of the plurality of vehicles parks in a non-public parking spot. Parking status information for parking spots includes at least one status type that is selected from a group consisting of leaving, filled, open and unknown.

In still other features of the invention, the method further comprises transmitting vector and location data when the vehicle leaves the public parking spot. The method comprises selectively generating location and parking indication data when an engine of the vehicle is turned off, and selectively transmitting the location and parking indication data. The method further comprises maintaining a list of vehicles that are subscribers of parking status reports. The parking status report for a respective one of the vehicles includes parking information related to parking spots within a predetermined distance of the at least one vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
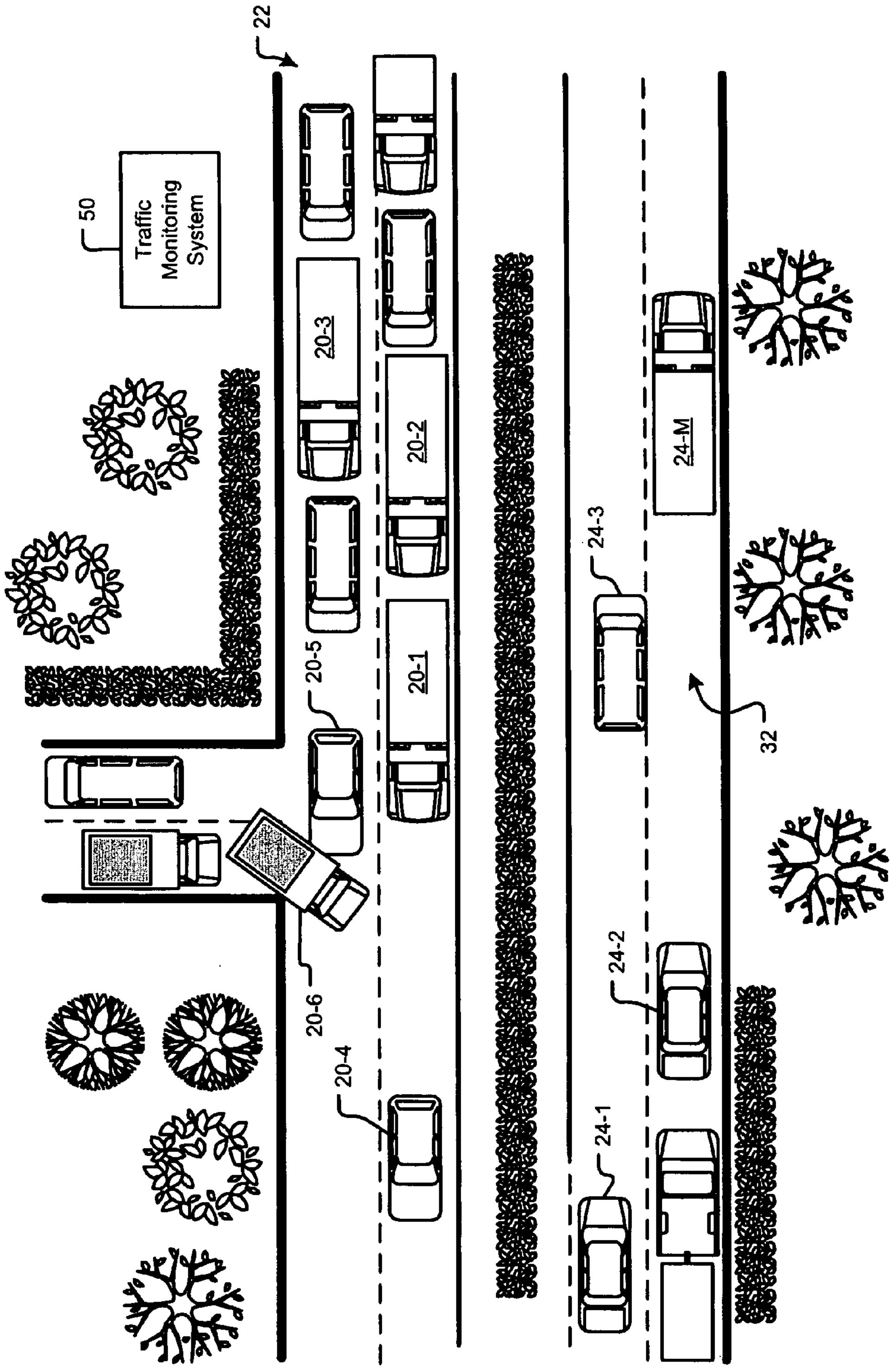
FIG. 1 illustrates an exemplary traffic monitoring system that monitors vehicle traffic according to the present invention.

The following description of the preferred embodiment(s) is merely exemplary in nature and is in no way intended to limit the invention, its application, or uses. For purposes of clarity, the same reference numbers will be used in the drawings to identify similar elements.

Referring now to FIG. 1, an exemplary traffic monitoring system that monitors vehicle traffic according to the present invention is shown. Vehicles 20-1, 20-2, . . . , and 20-N (generally identified as vehicles 20) travel on a road in a first direction generally identified at 22. Vehicles 24-1, 24-2, . . . , and 24-M (generally identified as vehicles 24) travel on the road in a second direction generally identified at 32. For example, vehicles 20-5 and 20-6 are involved in an accident, which slows the flow of traffic in the first direction 22. The accident does not slow traffic moving in the second direction 32. The traffic monitoring system alerts motorists of the slow traffic on the road traveling in the first direction, as well as information relating to traffic on other freeways, streets and other major thoroughfares.

According to the present invention, some of the vehicles 20 and 24 include global positioning systems (GPS) that include receivers that triangulate vehicle position based on signals generated by GPS satellites. In addition, the GPS may include an integrated transmitter and/or transceiver that transmits vector and location data wirelessly to a traffic monitoring system 50, which is located remotely from the vehicles 20 and 24. Alternately, a separate transmitter and/or transceiver may be used in conjunction with a receiver-only GPS. The vector data may include speed and direction data. The location data may include longitude and latitude information or location information using another coordinate system. The traffic monitoring system 50 receives the vector and location data, performs calculations on the data and transmits traffic and/or parking information back to the vehicles 20 and 24 with GPS systems with integrated transmitters and/or transceivers and/or GPS systems with separate transmitters and/or transceivers as will be described further below. The GPS systems of the vehicles provide visual and/or audible traffic information to allow drivers to avoid traffic bottlenecks such as the accident and/or to find parking spots.

Figure 2A:
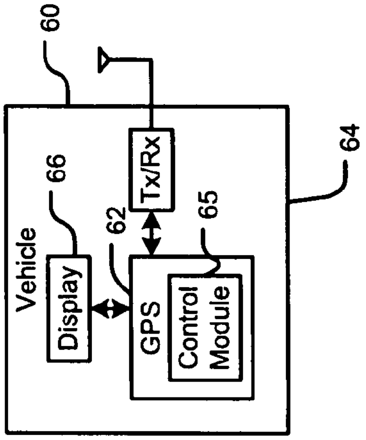
FIGS. 2A and 2B are functional block diagrams of exemplary vehicles including a GPS, a transceiver, a control module and a display.

Referring now to FIGS. 2A, 2B, 3A and 3B, several exemplary vehicle configurations are shown. While specific examples are shown, other configurations may be used. In FIG. 2A, a vehicle 60 includes a GPS 62, a wireless transceiver 64 and a display 66. A control module 65 that is integrated with the GPS 62 performs control functions relating to traffic and/or parking information systems. The GPS 62 triangulates position or location data of the vehicle 60 and calculates vector data using GPS signals generated by GPS satellites. The vehicle 60 selectively transmits the location and vector data wirelessly via the transceiver 64 to the remote traffic monitoring system 50. The transceiver 64 periodically receives traffic data from the remote traffic monitoring system 50 as will be described further below. The GPS systems 62 outputs traffic and other GPS-related information using the display 66. In some implementations, the transceiver 64 may be integrated with the GPS 62. As can be appreciated, the control module 65 may be separate from the GPS 62 as shown at 62' and 65' in FIG. 2B.

Figure 2B:
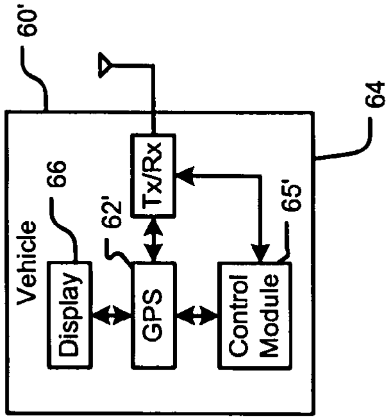
Figure 3A:
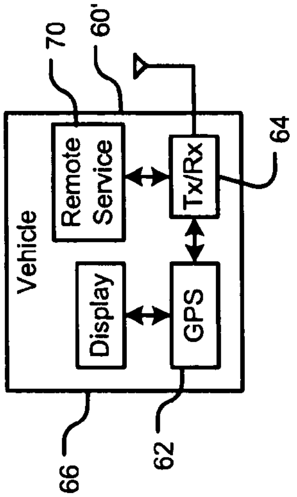
FIG. 3A is a functional block diagram of the exemplary vehicle of FIG. 2A with a remote service assistance (RSA) system.

In FIG. 3A, a vehicle 60' that is similar to FIGS. 2A and 2B is shown and further comprises a vehicle-based remote service assistance system 70, which provides a connection to a main remote service assistance system and/or a service assistant. For example, one suitable remote service assistance system 70 is OnStar®, although other remote service assistance systems may be utilized. In FIG. 3A, the remote service assistance system 70 and the traffic monitoring system 50 share the common transceiver 64. In some implementations, the transceiver 64 may be integrated with the GPS 62 and/or the remote service system 70.

Figure 3B:
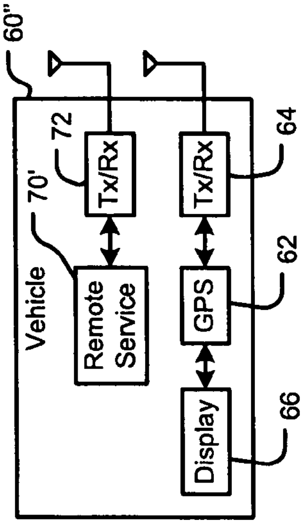
FIG. 3B is a functional block diagram of the exemplary vehicle of FIG. 2A with an alternate RSA system.

In FIG. 3B, a vehicle 60" that is similar to FIGS. 2A and 2B is shown and further comprises an alternate remote service assistance system 70'. In FIG. 3B, the remote service assistance system 70' utilizes a transceiver 72 that is separate from the transceiver 64 used by the GPS system 62. As can be appreciated, any suitable wireless systems may be employed including cellular systems, WiFi systems such as 802.11, 802.11a, 802.11b, 802.11g, 802.11n (which are hereby incorporated by reference), and/or other future 802.11 standards, WiMax systems such as 802.16 (which is hereby incorporated by reference) and/or any other suitable type of wireless system that allows communication over sufficient distances. In some implementations, one or both of the transceivers 64 and 72 are integrated with the GPS 62 and/or remote service system 70'. As in FIGS. 2A and 2B, the control module may be integrated with or separate from the GPS and/or other system components.

Figure 4:
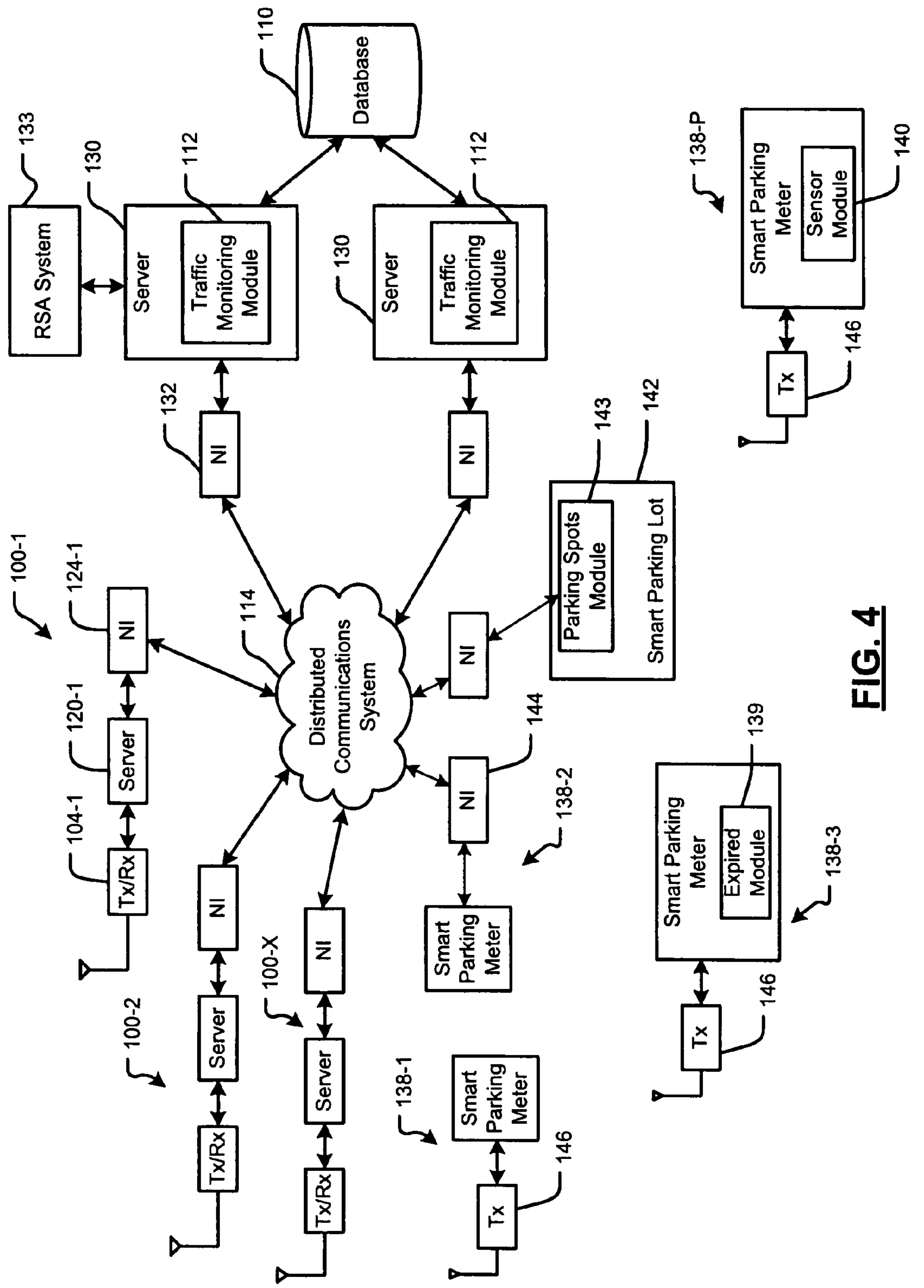
FIG. 4 is a functional block diagram of portions of an exemplary traffic monitoring system.

Referring now to FIG. 4, a functional block diagram of an exemplary traffic and/or parking monitoring system is shown. The traffic monitoring system includes a plurality of monitoring stations 100-1, 100-2, . . . , and 100-X (collectively monitoring stations 100) such as the station 50 shown in FIG. 1. The parking information can be provided in addition to or separate from the traffic information. The monitoring stations 100 include a transceiver 104. The monitoring stations 100 receive location and vector data from the vehicles and transmit traffic and/or parking information to the vehicles as will be described. To that end, the monitoring stations 100 are connected to one or more databases 110 that store traffic and/or parking information. Traffic monitoring modules or programs 112 analyze the data that is stored in the databases 110.

While the present invention will be described in conjunction with a distributed communications system 114, there are many other suitable ways of interconnecting the monitoring stations 100. The monitoring station 100-1 includes a server 120-1 and a network interface (NI) 124-1. The NI 124-1 provides a connection to the distributed communications system 114. In some implementations, the distributed communications system 114 includes the Internet, although any other type of network may be used. The databases 110 may also be connected to the distributed communications system 114 by servers 130 via NI 132. Other types of interconnection include dedicated phone lines, terrestrial links, satellite links and/or other suitable links may be used. The main RSA system 133 may communicate with one or more of the servers 130 and/or may have all independent links via the DCS 114.

The system may use an inquiry response technique and/or a push technique for providing parking and/or traffic information.

In addition to the foregoing, a plurality of smart parking meters 138-1, 138-2, . . . , and 138-P (collectively smart parking meters 138) can be provided. The smart parking meters 138 provide an indication when the parking spot is filled or vacant. In some implementations, the smart parking meter 138 may make this decision based on a meter status signal generated by an expired module 139. The expired module generates the meter status signal having a spot filled state when the meter is running. The meter status signal has a spot vacant state when the meter expires. In other words, when the meter is expired, the smart parking meter can assume that the spot is vacant.

Alternately, the smart parking meter 138 may include a sensor 140 that senses whether a vehicle is located in a corresponding parking spot. In some implementations, the sensor outputs a radio frequency signal in a direction towards the parking space and generates the meter status signal depending on reflected signals that are received. If the reflected signals are returned in a period less than a threshold and/or have an amplitude greater than a threshold, a vehicle is in the spot. If not, the spot is vacant. In some implementations, the reflected signals need to be less than the threshold for a predetermined period (to reduce noise). In still other embodiments, a group of meters may include a common sensor that senses the presence of one or more vehicles in one or more parking spots of the group. In addition, a parking lot 142 may include a parking spot module 143 that provides a collective signal that K parking spots are available in the entire parking lot 142. The smart parking meters 138 and smart parking lots 142 may be connected to the traffic monitoring system in any suitable manner including network interfaces (NI) 144, wireless transmitters 146 and/or in any other suitable manner. When transmitting the information, wireless or wired connections may be used.

Figure 5:
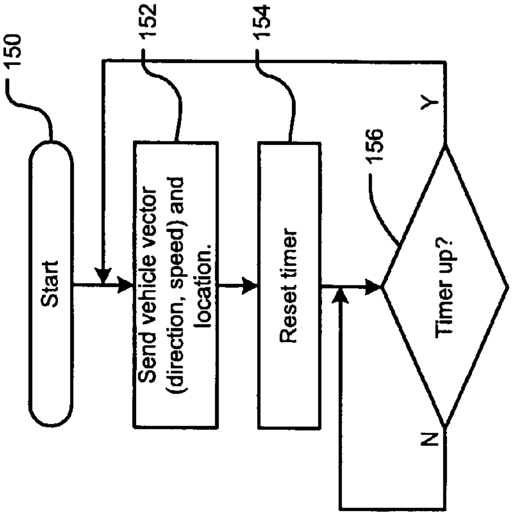
FIG. 5 is a flow chart illustrating exemplary steps performed by a vehicle for transmitting data.

Referring now to FIG. 5, a flow chart illustrating exemplary steps performed by systems associated with the vehicle are shown. In this exemplary embodiment, the vehicle sends vehicle vector and location data on a periodic basis. The data transmission may be selectively enabled while the vehicle ignition is on, the vehicle ignition is on or off, the vehicle is moving and/or using other criteria. Control begins with step 150. In step 152, the vehicle sends vector and location data. In step 154, a timer is reset. In step 156, control determines whether a timer is up. If false, control returns to step 156. If step 156 is true, control returns to step 152. Control may be performed by the GPS system 62 or using any other control module in the vehicle. Alternately and/or in addition to the foregoing, the traffic monitoring system may periodically query the vehicle remotely for vector and/or location data. The vehicle responds to the query by sending the vector and/or location data.

Figure 6:
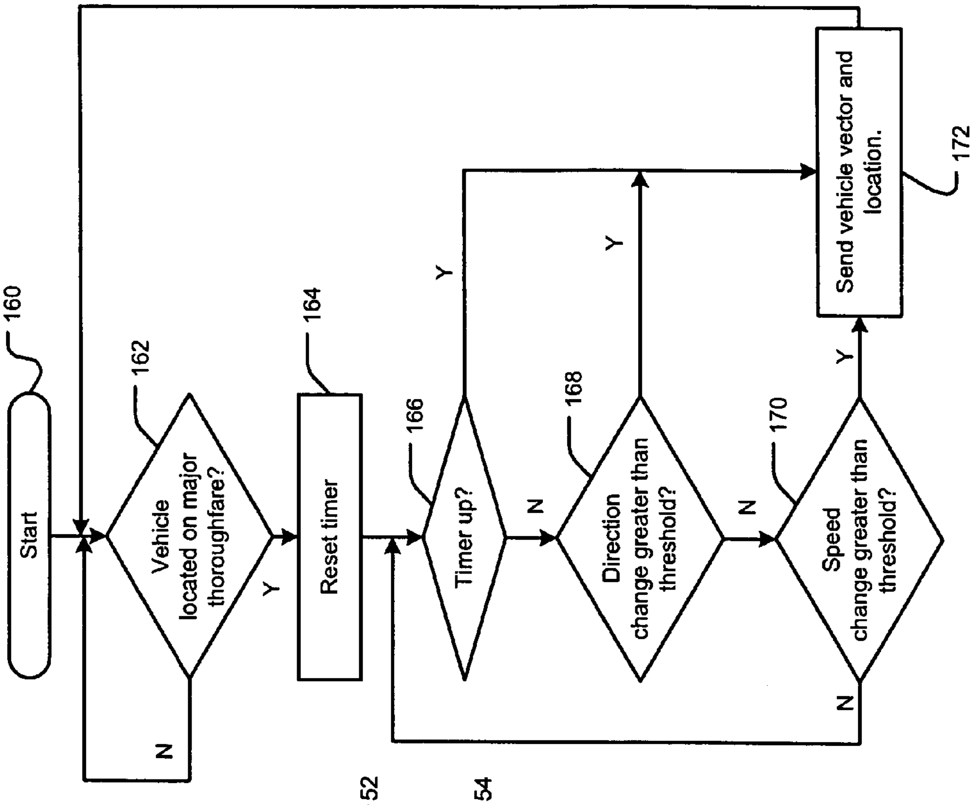
FIG. 6 is a flow chart illustrating first alternate exemplary steps performed by a vehicle for transmitting data.

Referring now to FIG. 6, a flow chart illustrating exemplary steps performed by systems associated with the vehicle are shown. Control begins with step 160. In step 162, control determines whether the vehicle is located on a major thoroughfare. For example, major thoroughfares may be defined to include freeways, highways and major streets. Major thoroughfares may exclude smaller streets, residential areas and low traffic streets to reduce the amount of data being sent. Since traffic is low on these types of roads, traffic information is not needed. If step 162 is false, control returns to step 162. If step 162 is true, control resets a timer in step 164. In step 166, control determines whether a timer is up. If not, control continues with step 168 and determines whether the vehicle has a direction change that is greater than a first threshold. If not, control continues with step 170 and determines whether the vehicle has incurred a speed change that is greater than a second threshold. Steps 166, 168 and 170 also tend to limit data being transmitted by the vehicle to the traffic monitoring system. One or more of these steps may be performed.

Figure 7B:
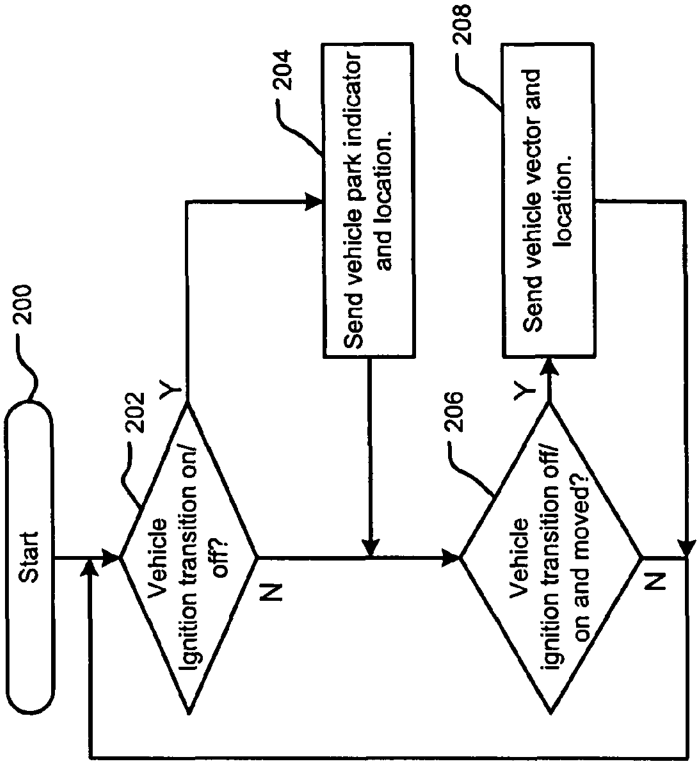
FIG. 7B is a flow chart illustrating alternate exemplary steps performed by the traffic monitoring system for transmitting parking-related data.
Figure 7A:
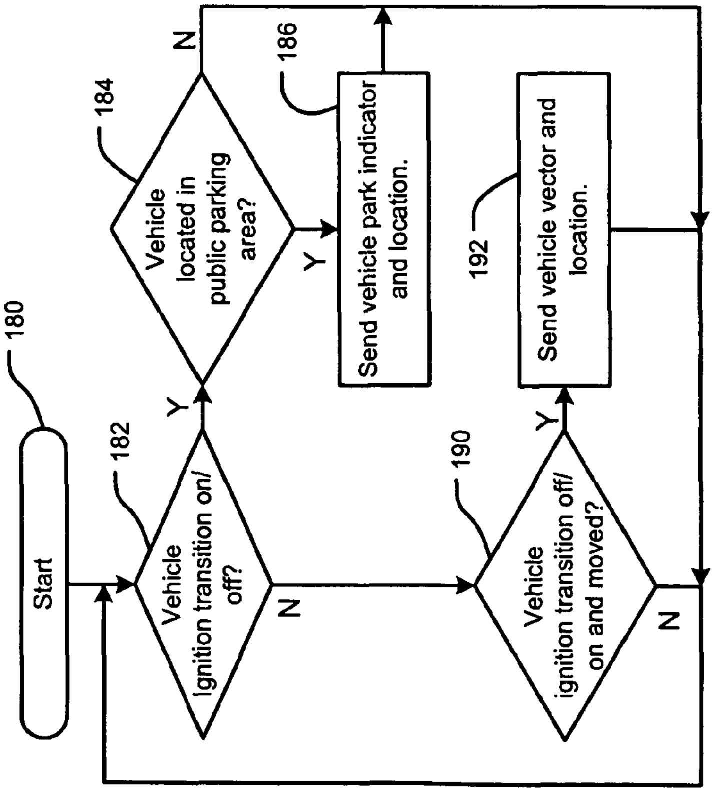
FIG. 7A is a flow chart illustrating exemplary steps performed by the traffic monitoring system for transmitting parking-related data.

Referring now to FIG. 7A, a flow chart illustrating exemplary steps performed by the traffic monitoring system is shown. Control begins with step 180. In step 182, control determines whether the vehicle ignition transitions from on to off. If true, control determines whether the vehicle is located in a public parking area in step 184. This step may be performed by the vehicle alone and/or by the vehicle transmitting location information to the traffic monitoring system and receiving a response indicating whether the location is a parking spot in a public parking area. If step 184 is true, the vehicle sends a park indicator and location data in step 186. Control continues from step 186 to step 182. If step 184 is false, control returns to step 182. Therefore, the traffic monitoring system receives data related to parked vehicles.

If step 182 is false, control continues with step 190 and control determines whether the vehicle ignition transitions from off to on and the vehicle is moved. When the ignition turns on, it is likely that the vehicle may exit the parking space. If step 190 is true, control sends vehicle vector and location data to the traffic monitoring system in step 192 and control returns to step 182. If step 190 is false, control also continues with step 182. The traffic monitoring system uses the vehicle parking and vehicle leaving data to provide parking information to other vehicles.

Referring now to FIG. 7B, a flow chart illustrating alternate exemplary steps performed by the traffic monitoring system are shown. Control begins with step 200. In step 202, control determines whether the vehicle ignition transitions from on to off. If step 202 is true, control sends vehicle park indicator and location data in step 204 and as described above. If step 202 is false, control continues with step 206. In step 206, control determines whether the vehicle ignition transitions from off to on and the vehicle is moved. If true, control sends vehicle vector and location data. If step 206 is false, control returns to step 202.

Figure 8:
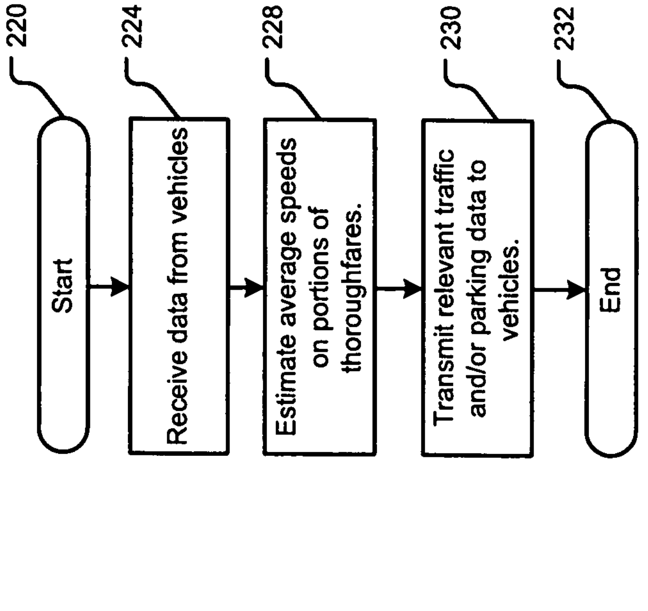
FIG. 8 is a flow chart illustrating steps performed by the traffic monitoring system for receiving and processing traffic and parking data.

Referring now to FIG. 8, a flow chart illustrating data collection and analysis steps performed by the traffic monitoring system are shown. Control begins with step 220. In step 224, control receives data from the vehicles. In step 228, control estimates average speeds on selected portions of thoroughfares based on data from one or more vehicles. For example, the traffic monitoring system may estimate average speeds for predetermined distances or increments. The increments may vary based on road type, conditions or calculated speeds. For example, as the difference between the average speeds and the posted speeds differ, the predetermined increment may be reduced in length. Traffic information is transmitted to the vehicles based upon calculations made on the collected vehicle data. The traffic information may be pushed to the vehicles and/or an inquiry/response technique may be used in step 230. Control ends in step 232. In addition to traffic information, parking data may also be transmitted to the vehicles using a push technique and/or an inquiry/response technique.

Figure 9:
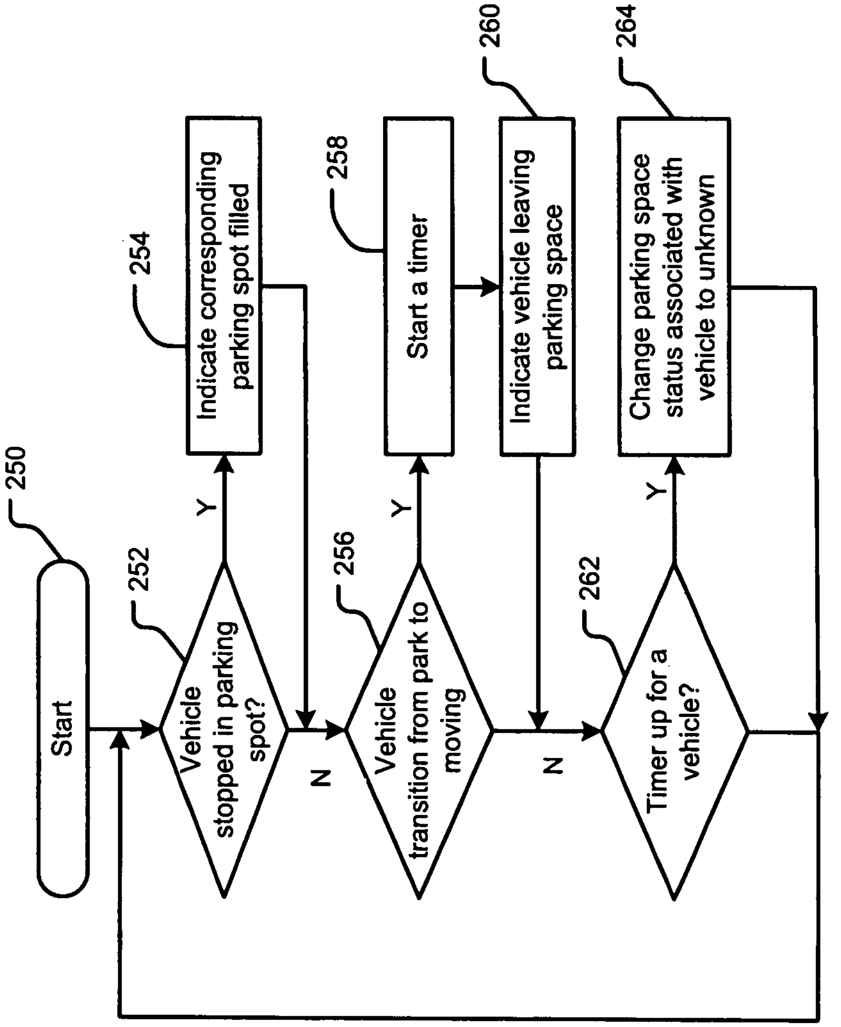
FIG. 9 illustrates steps performed by the traffic monitoring system for monitoring parking.

Referring now to FIG. 9, steps performed by the traffic monitoring system for monitoring parking are illustrated. Control begins with step 250. In step 252, control determines whether a vehicle is stopped in a public parking spot. The decision may be based on location and vector data samples and/or based on a parking indicator and location data. The determination that the parking spot is a public spot is based on the location data. If true, control indicates that the corresponding public parking spot is filled in step 254.

Control continues from steps 252 and 254 with step 256. In step 256, control determines whether a vehicle transitions from parking to moving. If step 256 is true, control starts a timer in step 258. In step 260, control indicates that a vehicle is leaving a public parking space. The timer is used to limit the amount of time that the parking space is identified as "vehicle leaving". Control continues from steps 256 and 260 with step 262. In step 262, control determines whether a timer for a vehicle is up. If step 262 is true, control changes a status of the parking space to unknown in step 264. Control continues from steps 262 and 264 with step 252.

Figure 10:
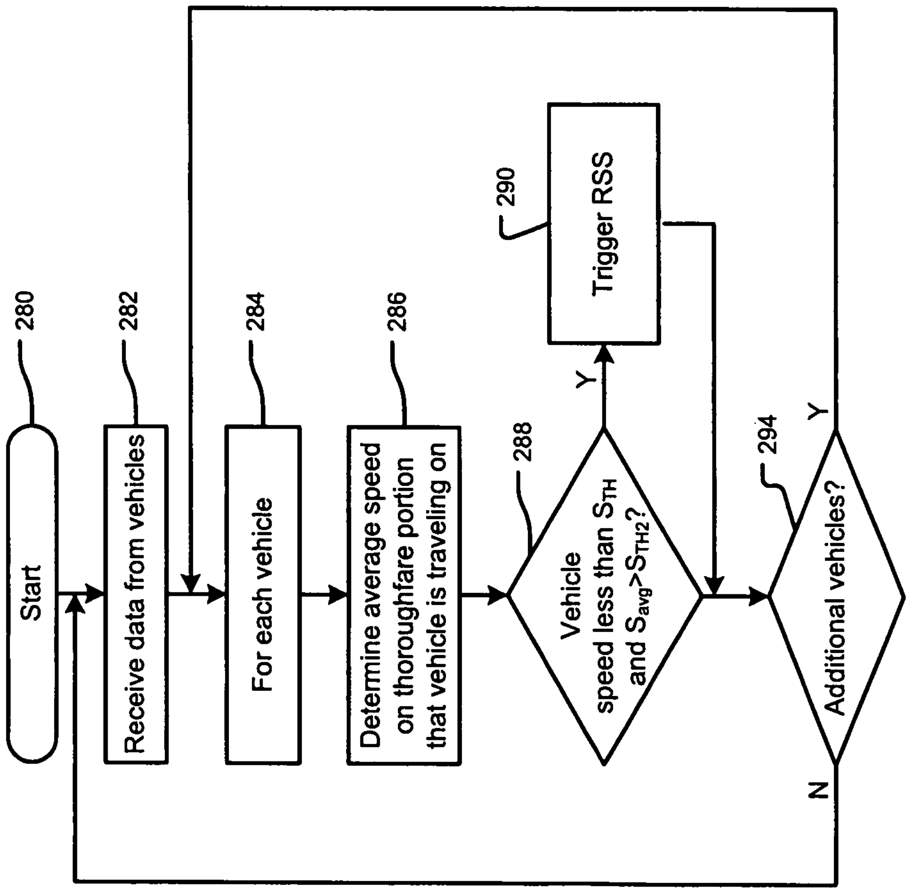
FIG. 10 illustrates steps performed by the traffic monitoring system and the RSA system for identifying vehicles having operational problems.

Referring now to FIG. 10, steps performed by the traffic monitoring system for identifying vehicles having operational problems are shown. Control begins with step 280. In step 282, control receives data from vehicles. In step 284 and 286, for each of the vehicles, control determines an average speed on a thoroughfare portion that the vehicle is traveling on. In step 288, control determines whether the speed of each vehicle is less than a first speed threshold and the average speed on a thoroughfare is greater than a second speed threshold.

For example, if the average speed on a thoroughfare is 50 mph and the speed of the vehicle is less than 5 mph, the vehicle may be having operational problems and/or may have been involved in an accident and require assistance. If step 288 is true, control triggers an inquiry via the remote service assistance system in step 290. For example, the traffic monitoring system notifies the main remote service assistance system to have a service assistant contact the driver of the vehicle. The service assistant can determine whether or not there is a problem such as an accident or other operational problem and contact emergency personnel, roadside assistance and/or other assistance as needed. Control continues from step 288 and 290 with step 294. In step 294, control determines whether there are additional vehicles to evaluate. If step 294 is true, control returns to step 284. If step 294 is false, control returns to step 282.

Figure 11:
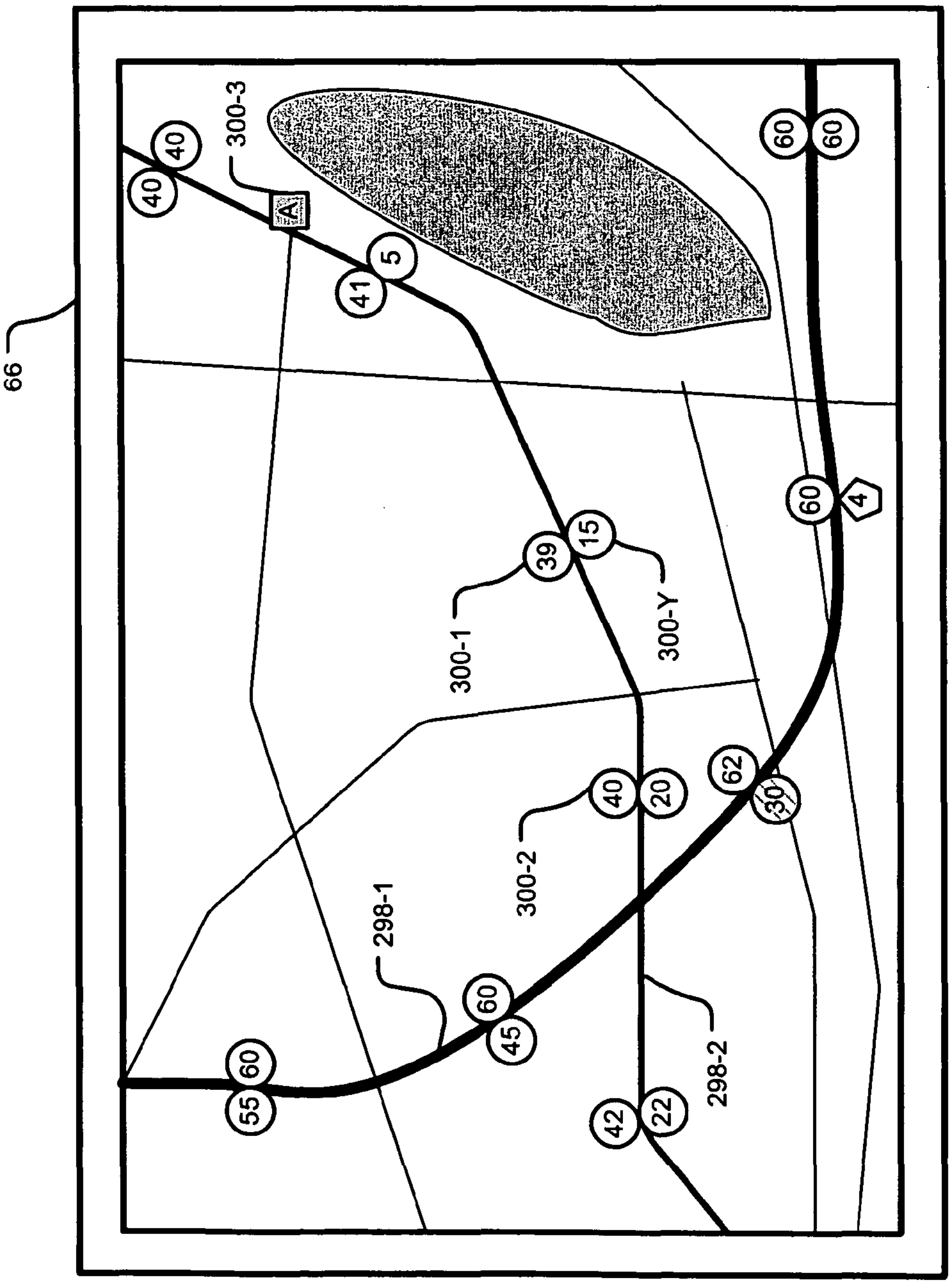
FIG. 11 illustrates an exemplary map display with average vehicle speeds on roads, accidents, construction and/or other items.

Referring now to FIG. 11, a display illustrating vehicle speeds on thoroughfares 298-1, 298-2, . . . and 298-Z is shown. The display 66 associated with the GPS system at 62 is shown. Visual elements generally identified by 300-1, 300-2, . . . , and 300-Y are provided on the map. The visual elements indicate bottlenecks and/or other traffic on the main thoroughfares. Any suitable visual indication may be used to identify problems. For example, color, cross-hatching, shading, shapes, blinking and/or other techniques may be used to identify high traffic zones, low speed zones, construction zone, and/or accident zones. For example, visual element 300-3 may be rendered in red and flashing to signify an accident. Speeds on the thoroughfare also provide an indication of a problem (e.g. the speeds decrease as the distance to the accident 300-3 decreases).

Figure 12:
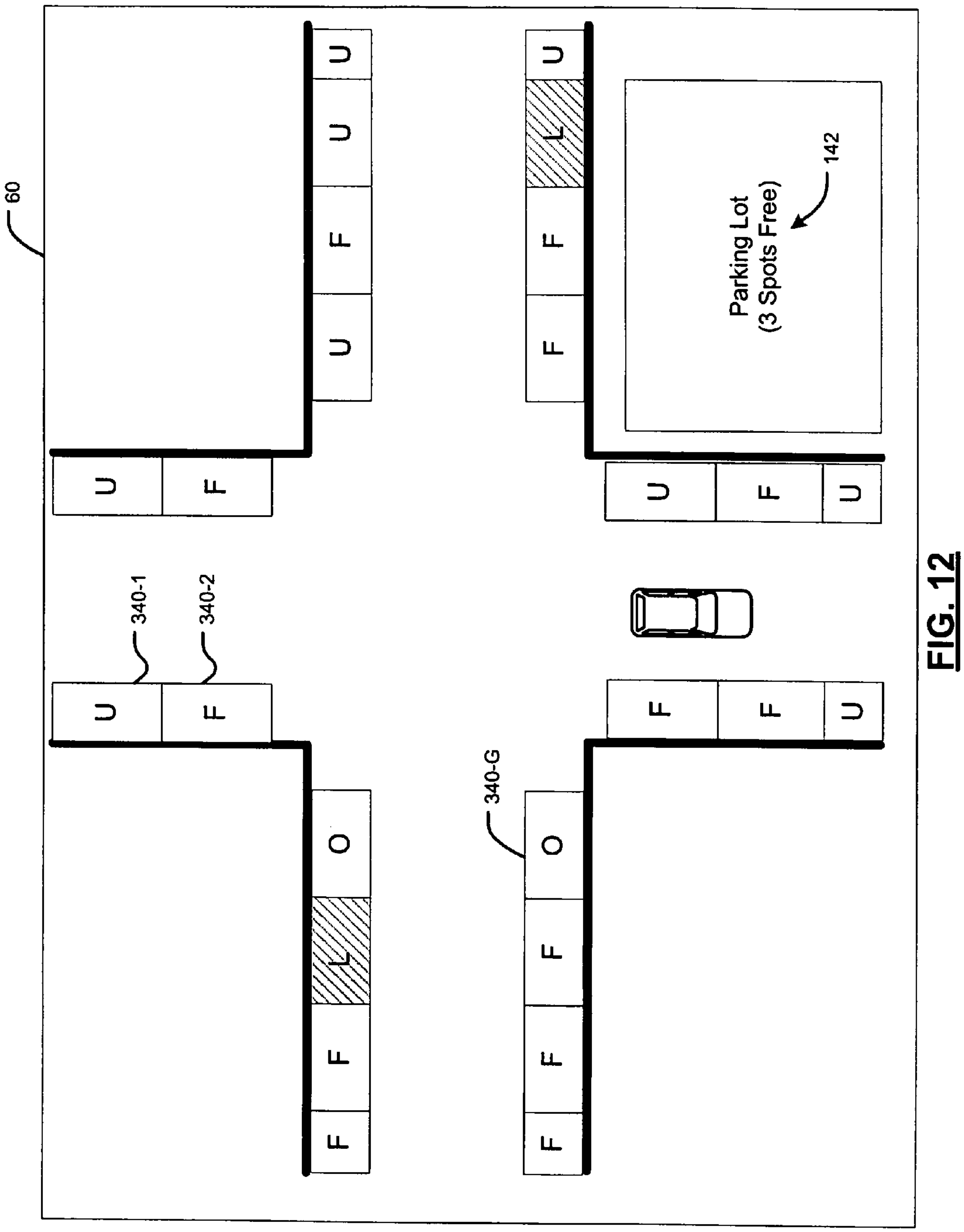
FIG. 12 illustrates an exemplary display of available parking in the vicinity of the vehicle.

Referring now to FIG. 12, an exemplary display of available parking in the vicinity of the vehicle is shown. Based on information collected, the display 60 of the GPS 62 can be used to identify available parking spaces 340-1, 340-2, . . . , and 340-G in a selected area. The traffic monitoring system may provide filled (F), leaving (L), open (O) and/or unknown (U) status data for parking spaces in a selected area. These indicators may be designated using any suitable visual indication.

The filled indicator is used when a vehicle with the GPS system parks in the spot and the traffic monitoring system does not receive data indicating that the vehicle has moved. The unknown indicator is used when there is no information concerning the space and/or after a predetermined amount of time after a vehicle with a GPS system leaves a parking spot. A leaving indicator is used within a predetermined time after a vehicle with a GPS system leaves a parking spot. The leaving indicator may also be triggered when a vehicle with a GPS system starts its engine after a dwell period. The open status is used when the space is open. In some implementations, the status is provided by smart parking meters 138. Spaces in smart parking lots 142 may also be shown at 342.

Figure 13:
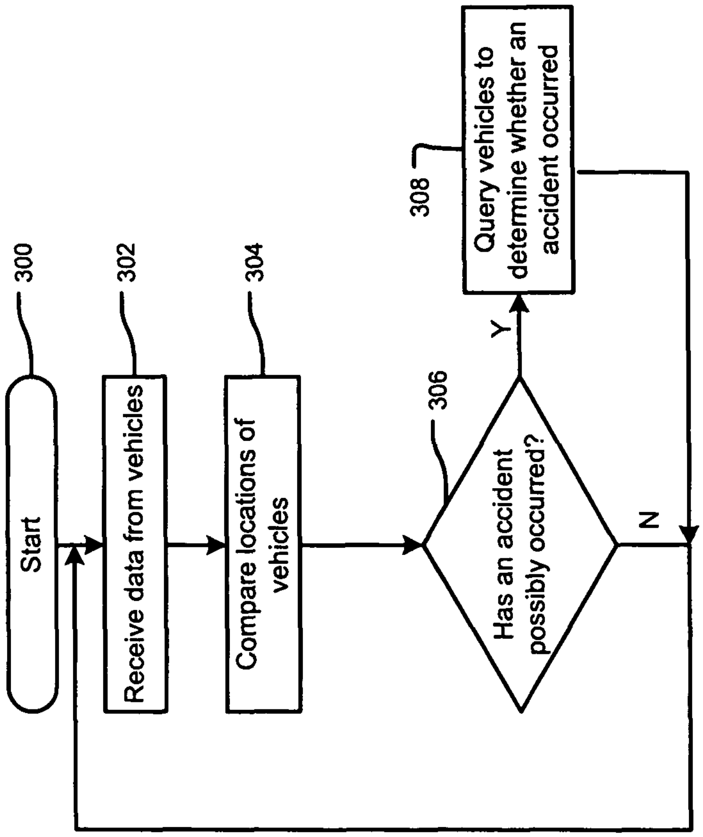
FIG. 13 illustrates steps performed by the traffic monitoring system to identify possible vehicle accidents.

Referring now to FIG. 13, steps for identifying accidents are shown. Control begins in step 300. In step 302, the traffic monitoring system receives data from vehicles. In step 304, the traffic monitoring system compares locations of the vehicles at the same time. Based on the location and time, the traffic monitoring system can determine whether an accident may have occurred. If the vehicles have substantially the same location at the same time, the traffic monitoring system may query the users to determine whether an accident has occurred in step 308. In other words, if two vehicles provide their location at a particular time and the locations conflict, the traffic monitoring system may assume that there is a possibility that an accident occurred and take action via the remote service assistance system.

Figure 14:
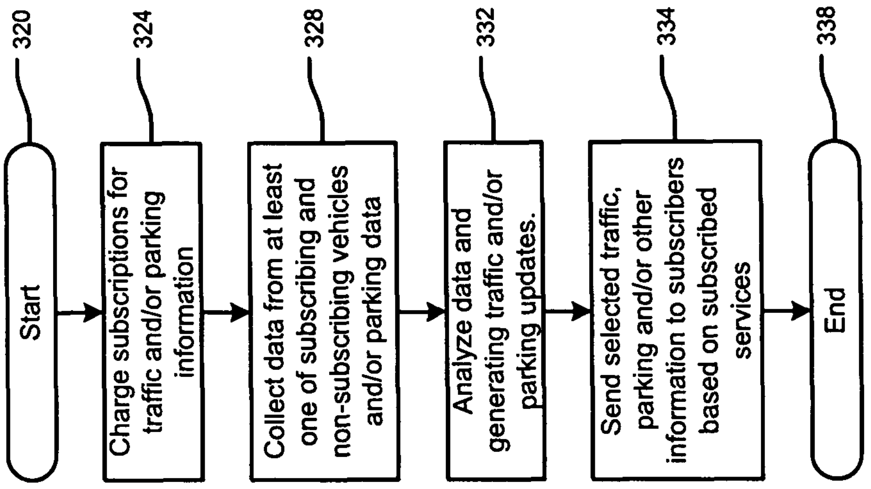
FIG. 14 illustrates steps performed by an exemplary traffic and/or parking information subscriber system.

Referring now to FIG. 14, a subscriber service according to the present invention is shown. Control begins in step 320. In step 324, fees are charged for subscription services. The fees can be based on the level of service that is requested. In step 328, data is collected from at least one of subscribing and non-subscribing vehicles and/or from smart parking meters and/or lots. In some implementations, data from other subscriber systems may be used. In step 332, data is analyzed and traffic, parking and other information is generated. In step 334, selected traffic, parking and/or other information is sent to subscribers based on subscribed services of the user. For example, some users may pay a subscription fee to receive traffic information but not parking information. Other subscribers may receive either parking information only or traffic and parking information. The subscriber levels may also be differentiated based on geography, time of day and/or using other criteria. Control ends in step 338.

Figure 15:
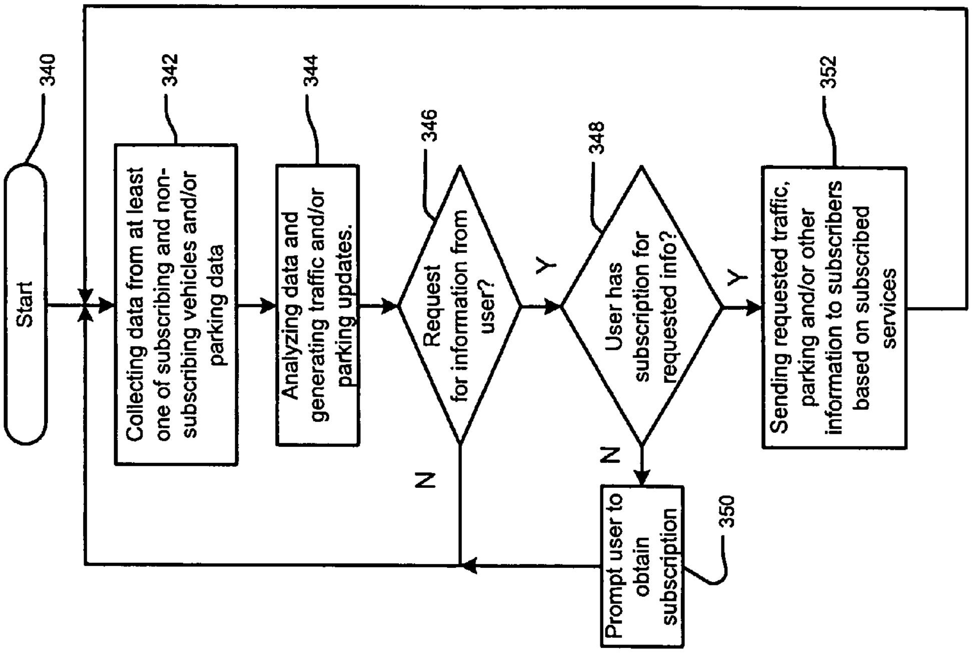
FIG. 15 illustrates steps performed by another exemplary traffic and/or parking information subscriber system.

Referring now to FIG. 15, another exemplary subscriber service according to the present invention is shown. Control begins in step 340. In step 342, data is collected from at least one of subscribing and non-subscribing vehicles and/or from smart parking meters and/or lots. In step 344, data that is collected is analyzed and traffic, parking and other information is updated. In step 346, control determines whether a request for information is received. Alternately, the information can be pushed to the user based on the subscription of the user. If step 346 is false, control returns to step 342. If step 346 is true, control determines whether the user has a subscription for the requested information. If false, control prompts the user to obtain a subscription. The subscriptions can be on a periodic basis, a pay-per-use basis or on any other basis. If step 348 is true, the requested information is sent to the subscriber. As can be appreciated, encryption and/or other techniques may be used to prevent fraudulent access to the traffic and/or parking information.

Those skilled in the art can now appreciate from the foregoing description that the broad teachings of the present invention can be implemented in a variety of forms. As can be appreciated, steps of methods disclosed and claimed can be performed in an order that is different than that described and claimed herein without departing from the spirit of the present invention. Therefore, while this invention has been described in connection with particular examples thereof, the true scope of the invention should not be so limited since other modifications will become apparent to the skilled practitioner upon a study of the drawings, the specification and the following claims.

What is claimed is:

1. A traffic information system for a vehicle, the traffic information system comprising:

a global positioning system (GPS) associated with the vehicle, the GPS configured to selectively generate location and vector data;

a transmitter;

a control module configured to i) receive the location and vector data, ii) wirelessly transmit the location and vector data using the transmitter when the vehicle is traveling on a first set of predetermined roads, and iii) not transmit the location and vector data when the vehicle is traveling on a second set of roads; and a remote traffic monitoring system configured to i) receive the vector and location data, ii) compare a speed of the vehicle on a first road to a first nonzero threshold and to an average traffic speed on the first road, iii) compare the average traffic speed to a second threshold, and iv) selectively trigger contact with the vehicle via a service assistance system and a remote service assistance system if both (a) the speed of the vehicle is less than both the first nonzero threshold and the average traffic speed, and (b) the average traffic speed is greater than the second threshold.

2. The traffic information system of claim 1, further comprising a receiver i) configured to communicate with the control module and ii) wirelessly receive traffic reports from the remote traffic monitoring system.

3. The traffic information system of claim 2, wherein the traffic reports include traffic speed information for traffic traveling on at least one of the first set of predetermined roads.

4. The traffic information system of claim 2, wherein the traffic reports include parking status information for public parking spots.

5. The traffic information system of claim 4, wherein the parking status information for the public parking spots includes at least one status type selected from a group consisting of leaving, filled, open and unknown.

6. The traffic information system of claim 2, wherein the control module is configured to i) selectively generate location and parking indication data when an engine of the vehicle is turned off and ii) selectively transmit the location and parking indication data using the transmitter.

7. A system comprising the traffic information system of claim 6, wherein the system further comprises a parking monitoring system located remotely from the vehicle, the parking monitoring system configured to i) receive the location and parking indication data from the vehicle and a plurality of other vehicles, ii) generate parking status reports, and iii) selectively transmit the parking status reports to the vehicle.

8. The system of claim 7, further comprising:

a parking lot module associated with a parking lot, the parking lot module configured to identify available parking spots in the parking lot; and a transmitter configured to transmit parking lot data related to the available parking spots to the parking monitoring system.

9. The system of claim 8, wherein the parking status report is based in part on the parking lot data.

10. The system of claim 7, further comprising:

a parking spot module associated with a parking spot, the parking spot module configured to identify a filled status of the parking spot; and a transmitter configured to transmit parking spot data based on the filled status to the parking monitoring system.

11. The system of claim 10, wherein the parking report is based in part on the parking spot data.

12. The system of claim 7, wherein the parking status reports include parking spot information related to parking spots within a predetermined distance of the vehicle.

13. The system of claim 12, wherein the parking spot information includes a parking status for parking spaces on at least one road, wherein the parking status includes at least one selected from a group consisting of vacant, filled, unknown, and leaving.

14. A system comprising the traffic information system of claim 1, wherein the system further comprises the service assistance system configured to i) communicate with the control module and ii) wirelessly communicate with the remote service assistance system.

15. The traffic information system of claim 1, wherein the control module is configured to transmit the vector and location data on a periodic basis.

16. The traffic information system of claim 1, wherein the control module is configured to i) monitor changes in direction of the vehicle and ii) transmit the vector and location data when the vehicle changes direction greater than a direction change threshold.

17. The traffic information system of claim 1, wherein the control module is configured to i) monitor changes in speed of the vehicle and ii) transmit the vector and location data when the vehicle speed change is greater than a speed change threshold.

18. The traffic information system of claim 1, wherein the control module is configured to selectively transmit parking indication and location data using the transmitter when an ignition of the vehicle ignition is turned off.

19. The traffic information system of claim 18, wherein the control module is configured to selectively transmit parking indication and location data using the transmitter when the ignition is turned off and the vehicle is parked in a public parking spot.

20. The traffic information system of claim 19, wherein the control module is configured to selectively transmits vector and location data using the transmitter when the vehicle leaves the public parking spot.

21. The traffic information system of claim 1, wherein the control module is integrated with the GPS.

22. A method for operating a traffic information system for a vehicle, comprising:

selectively generating location and vector data using a global positioning system associated with a vehicle;

wirelessly transmitting the location and vector data when the vehicle is traveling on a first set of predetermined roads;

disabling transmission of the location and vector data when the vehicle is traveling on a second set of roads;

comparing a speed of the vehicle on a first road to a first nonzero threshold and to an average traffic speed on the first road;

comparing the average traffic speed to a second threshold; and selectively triggering contact with the vehicle using a remote service assistance system based on the comparison if the speed is less than the first nonzero threshold and the average traffic speed, and the average traffic speed is greater than the second threshold.

23. The method of claim 22, further comprising wirelessly receiving traffic reports at the vehicle from a remote traffic monitoring system.

24. The method of claim 23, wherein the traffic reports include traffic speed information for traffic traveling on at least one of the first set of predetermined roads.

25. The method of claim 23, wherein the traffic reports include parking status information for public parking spots.

26. The method of claim 25, wherein the parking status information for a parking spot includes at least one status type selected from a group consisting of leaving, filled, open and unknown.

27. The method of claim 23, further comprising:

selectively generating location and parking indication data when an engine of the vehicle is turned off; and selectively transmitting the location and parking indication data.

28. The method of claim 27, further comprising:

receiving the location and parking indication data from the vehicle and a plurality of other vehicles;

generating parking status reports; and selectively transmitting the parking status reports to the vehicle.

29. The method of claim 28, further comprising:

identifying available parking spots in a parking lot; and wirelessly transmitting parking lot data related to the available parking spots to a remote parking monitoring system.

30. The method of claim 29, wherein the parking status report is based in part on the parking lot data.

31. The method of claim 28, further comprising:

identifying a filled status of a parking spot; and transmitting parking spot data based on the filled status to a remote parking monitoring system.

32. The method of claim 31, wherein the parking reports are based in part on the parking spot data.

33. The method of claim 28, wherein the parking status reports include parking spot information related to parking spots within a predetermined distance of the vehicle.

34. The method of claim 33, wherein the parking spot information includes a parking status for a parking spot, wherein the parking status includes at least one selected from a group consisting of vacant, filled, unknown, and leaving.

35. The method of claim 22, further comprising transmitting the vector and location data on a periodic basis.

36. The method of claim 22, further comprising:

monitoring changes in direction of the vehicle; and transmitting the vector and location data when the vehicle changes direction greater than a direction change threshold.

37. The method of claim 22, further comprising:

monitoring changes in speed of the vehicle; and transmitting the vector and location data when one of the changes in speed is greater than a speed change threshold.

38. The method of claim 22, further comprising selectively transmitting parking indication and location data when an ignition of the vehicle is turned off.

39. The method of claim 38, further comprising selectively transmitting parking indication and location data when the ignition is turned off and the vehicle is parked in a public parking spot.

40. The method of claim 39, further comprising transmitting vector and location data when the vehicle leaves the public parking spot.

* * * * *